July 31, 1923.                               1,463,171
G. J. MEAD
VALVE OPERATING MECHANISM
Filed May 9, 1921

George J. Mead,
Inventor
By his Attorney

Patented July 31, 1923.

1,463,171

UNITED STATES PATENT OFFICE.

GEORGE J. MEAD, OF GLEN ROCK, NEW JERSEY.

VALVE-OPERATING MECHANISM.

Application filed May 9, 1921. Serial No. 468,057.

*To all whom it may concern:*

Be it known that I, GEORGE J. MEAD, a citizen of the United States, residing at Glen Rock, Passaic County, State of New Jersey, have invented new and useful Improvements in Valve-Operating Mechanism, of which the following is a specification, reference being had to the accompanying drawings.

My invention relates to adjustable valve operating mechanism for internal combustion engines and has for an object to provide a mechanism in which the cam shaft operating the valve may be turned independently of the mechanism driving the shaft, for the purpose of adjusting the timing of the valve.

In internal combustion engines the exhaust and intake valves are customarily operated by cams mounted upon a cam shaft which is driven by appropriate connections with the main shaft or crank shaft of the engine. In order that the opening and closing of the valves may be properly timed with respect to the position of the pistons when the engine is in operation, it is necessary that the drive between the crank shaft and the cam shaft be positive. This driving connection has heretofore been arranged in such a manner that the cam shaft cannot be disconnected from the crank shaft except by taking apart the whole connecting mechanism. Such a construction involves many disadvantages. It requires a determination of the timing of the valves when the engine is assembled and this timing cannot be readily adjusted thereafter. This is particularly disadvantageous in multiple cylinder engines in which the valves of separate cylinders or pairs of cylinders are operated by independent cam shafts. Furthermore, the construction heretofore used makes is necessary to turn over the crank shaft of the engine when it is desired to operate the valves in order to observe their action.

In accordance with the present invention, a releasable connection is provided in the mechanism driving the cam shaft. This connection is so arranged that a positive driving connection can be secured in practically all possible different rotative or angular relations of the cam shaft to the drive shaft. The mechanism permits an adjustment of the valve timing at any time with a minimum of time, trouble or expense. This is particularly advantageous in engines in which valves of different cylinders are operated by different cam shafts as in such cases independent adjustment of the valves of different cylinders may be made so that a more efficient operation of each cylinder can be obtained, and the operation of the whole engine may thus be better synchronized. Furthermore, it permits operation of the cam shaft and the valves for the purposes of observation and repair without turning the crank shaft of the engine.

The accompanying drawings illustrate a simple and convenient mechanism incorporating the invention.

Figure 1:
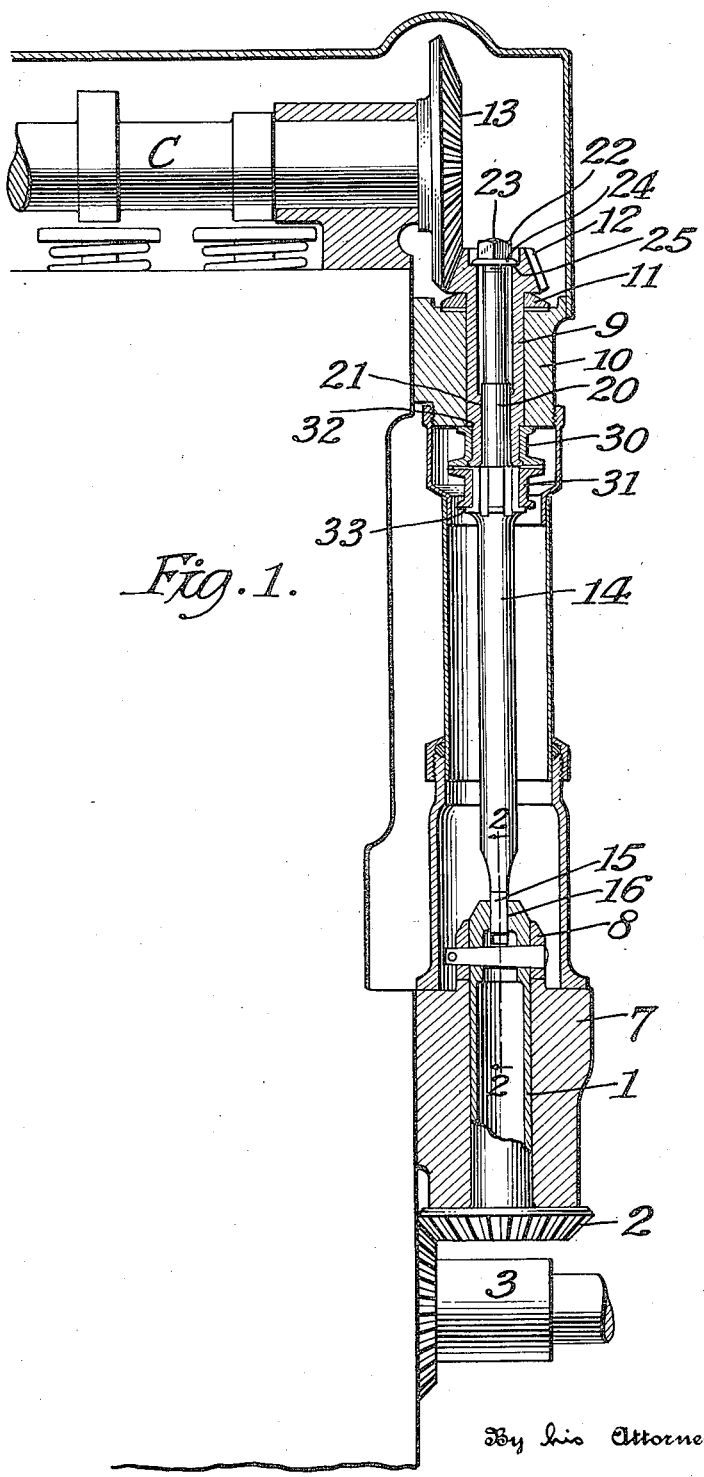
Fig. 1 is a fragmentary side view partly in vertical section showing in detail the driving mechanism for one of the cam shafts.
Figure 2:
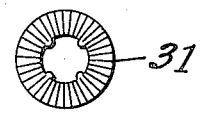
Fig. 2 is a transverse section taken on the line 2—2 of Fig. 1 and showing the sliding connection between the drive shaft and the shaft extension.

The valves of a set of cylinders of an internal combustion engine are operated by a cam shaft C. The cylinders are not shown here. The countershaft 1 is driven by a series of gears 2 from the crank shaft 3 of the engine. The vertical shaft 14 is driven from the countershaft 1 by a slide joint. The vertical drive shaft 14 drives the cam shaft by means of the connecting mechanism shown in detail in Figs. 1, 2 and 3.

The countershaft 1 is supported in a vertical bearing 7 and is restrained against downward movement in this bearing by a thrust bearing 8. The hollow driven shaft 9 is supported in vertical alignment with the countershaft 1 by a bearing 10. A thrust bearing 11 restrains hollow shaft 9 from downward movement. The hollow driven shaft 9 is provided with a bevelled gear 12, preferably made integral with it, as shown, which meshes with a bevelled gear 13 upon the cam shaft C.

The drive shaft 14 is provided with an axially slidable extension having at its lower end a non-circular stud 15 which slides in a non-circular aperture 16 at the upper end of the countershaft 1.

The shaft 14 extends up through the hollow shaft 9 and has a bearing surface 20 which has a running fit with a bearing surface 21 on the interior of the hollow shaft 9. The engagement of the stud 15 with the aperture 16 in the counter shaft 1 and the engagement of the bearing surface 20 in the hollow shaft 9 retain the intermediate shaft 14 in alignment with the counter shaft 1 and the hollow driven shaft 9. The shaft 14 has at its upper end a threaded member engaging the hollow shaft 9. In the form shown, the threaded member comprises a nut 22 screwed upon a threaded stud 23 at the upper end of the shaft 14 and a washer 24 which engages an internal shoulder 25 upon the hollow shaft 9.

Two toothed clutch members 30, 31, are mounted respectively upon the hollow shaft 9 and upon shaft 14. Each of the engaging members is retained against rotation with respect to the member upon which it is mounted by being keyed or splined thereto. An external shoulder 32 upon the hollow shaft 9 prevents the clutch member 30 from moving upwardly upon the hollow shaft 9. A shoulder 33 upon the shaft 14 prevents the clutch member 31 from moving downwardly on the shaft 14.

Figure 3:
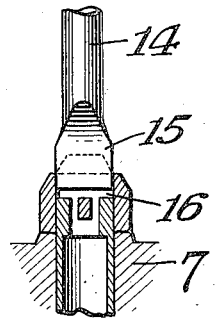
Fig. 3 is a top view of the lower toothed clutch member.

The cooperating engaging surfaces of the clutch members 30, 31 are perpendicular to the axis of the alinged shafts and each of them is provided with a plurality of closely spaced radial ribs or teeth (Fig. 3).

The operation of the device described is as follows: When the nut 22 is screwed downwardly upon the stud 23 the engagement of the washer 24 with the hollow shaft 9 results in drawing the shaft 14 upwardly, bringing the teeth of the clutch member 31 into engagement with those of the clutch member 30 so that a positive driving connection between the driving shaft and the cam shaft is secured.

When it is desired to adjust the timing of the valves it is only necessary to loosen the nut 22, which allows the shaft 14 to slide down until the teeth of the clutch member 31 are free from the teeth of the clutch member 30. The cam shaft C may then be turned independently of the drive shaft 14 and of the engine shaft 3 so that a proper positioning of the cam shaft with respect to the position of the pistons may be secured. When the desired adjustment has been obtained, the nut 22 is screwed down, which draws the shaft 14 upward and brings the teeth of the clutch member 31 into engagement with those of the clutch member 30. Owing to the large number of teeth provided on the engaging surface of each clutch member, such engagement may be secured in a plurality of different angular or rotative relations between the shaft 14 and counter-shaft 1 on the one hand and the hollow shaft 9 and the cam shaft C on the other hand. The radial teeth are so closely spaced that from a practical point of view any desired angular adjustment may be obtained.

Where there are separate cam shafts and separate drive shafts and the invention here described is employed, each of the cam shafts may be independently released from the corresponding drive shaft and separate adjustment of the valves of each set of cylinders may thus be secured.

Another important use of the releasable connection is to permit observation of the valve action of any pair of cylinders, or to allow of the convenient and quick repair of any valve. For such observation or repair it is not necessary to turn the crank shaft of the engine. It is merely necessary to release the nut on the connecting mechanism of the cam shaft controlling the valves to be inspected or repaired and to turn that cam shaft independently of the crank shaft and of the other cam shafts. The only part of the connecting mechanism which is turned with the cam shaft is the hollow shaft 9. It is obvious that any cam shaft and its connected hollow shaft 9 may be turned with very much less effort than would be necessary in turning the crank shaft of the engine.

It is obvious that the invention may be applied to internal combustion engines at points other than those heretofore indicated. For example, the cam shaft may be driven by an integral drive shaft, the latter being driven by the crank shaft through appropriate means, or, the cam shaft may be driven by a spur gear upon the cam shaft, an idler gear or gear train and a spur gear upon the crank-shaft. In either of these cases, the cam shaft itself may contain the connecting mechanism, including the two toothed clutch members, 30, 31, and the respective shafts upon which they are mounted. The integral drive shaft or the gear train would engage the part of the cam shaft which was equivalent in function to the hollow shaft 9, this part of the cam shaft being capable of movement into and out of engagement with the other part of the cam shaft, substantially in the same manner as heretofore shown with respect to the engaging of the hollow shaft 9 and the shaft 14.

The shaft 14 has the functions of an intermediate shaft and may be so termed.

What I claim is:

1. A releasable driving connection, comprising drive and driven shafts, one of said shafts having an extension, co-operating radially toothed clutch members on said extension and the other shaft respectively, means for sliding said extension so as to bring said clutch members into and out of engagement, and releasable means for retaining said clutch members in engaging position.

2. A releasable driving connection, comprising two shafts, one of which is hollow, bearings for said shafts retaining them in coaxial relation and restraining them against longitudinal movement, one of said shafts having an extension extending into the hollow shaft and slidable therein, co-operating clutch members upon the hollow shaft and said extension, and means reacting between the hollow shaft and said extension for sliding said extension as to bring said clutch members into engagement.

3. A releasable driving connection, comprising two shafts, one of which is hollow, an intermediate shaft extending through the hollow shaft and having a slidable driving connection with the other shaft, cooperating toothed clutch members upon said intermediate shaft and the hollow shaft respectively, and a threaded member upon said intermediate shaft adapted to draw it into the hollow shaft and bring said clutch members into engagement.

4. A releasable driving connection, comprising two shafts, one of which is hollow, and the other of which has a hole in its end, an intermediate shaft having at one end a projection fitting into said hole, said intermediate shaft extending through the hollow shaft and having at its projecting end a threaded member engaging the hollow shaft, cooperating radially toothed clutch members upon said intermediate shaft and hollow shaft respectively, and so located that they may be drawn into engagement by turning said threaded member.

5. A releasable driving connection comprising two shafts, bearings for said shafts restraining them against axial movement, one of said shafts having a hole in its end and the other of said shafts being hollow, an intermediate shaft having at one end a projection fitting into said hole, said intermediate shaft extending through the hollow shaft and having a bearing therein, a radially toothed clutch member mounted upon one end of said hollow shaft, a radially toothed clutch member mounted upon said intermediate shaft beyond the said end of said hollow shaft, a threaded member mounted upon the end of the intermediate shaft opposite said radially toothed clutch member adapted, when turned in one direction to draw the intermediate shaft so as to bring said clutch members into engagement and, when turned in the other direction to permit said intermediate shaft to be moved so that said clutch members become out of engagement.

6. A releasable driving connection comprising two vertical shafts, bearings for said shafts restraining them against vertical movement, the lower one of said shafts having a hole in its end, and the upper of said shafts being hollow, an intermediate shaft having at its lower end a projection fitting into said hole, said intermediate shaft extending through the hollow shaft and having a bearing therein, a radially toothed clutch member mounted upon the lower end of said hollow shaft, a radially toothed clutch member mounted upon said intermediate shaft below the lower end of the hollow shaft, a threaded member mounted upon the upper end of the intermediate shaft and adapted when turned in one direction, to draw the intermediate shaft upward so as to bring said clutch members into engagement, and, when turned in the other direction, to permit said intermediate shaft to drop so that said clutch members become out of engagement.

7. A releasable driving connection comprising a hollow shaft, a slidable drive shaft extending through the hollow shaft and having at its projecting end a threaded member engaging one end of the hollow shaft, a radially toothed clutch member at the other end of the hollow shaft, a radially toothed clutch member upon the sliding shaft adapted to be drawn into engagement with the clutch member upon the hollow shaft when said threaded member is turned in one direction, and a gear mounted on the hollow shaft and arranged to mesh with a gear mounted upon the cam shaft of the engine.

GEORGE J. MEAD.